Aug. 23, 1932.   W. BERGER   1,872,650
DEVICE FOR MEASURING LIQUIDS
Filed Nov. 21, 1929
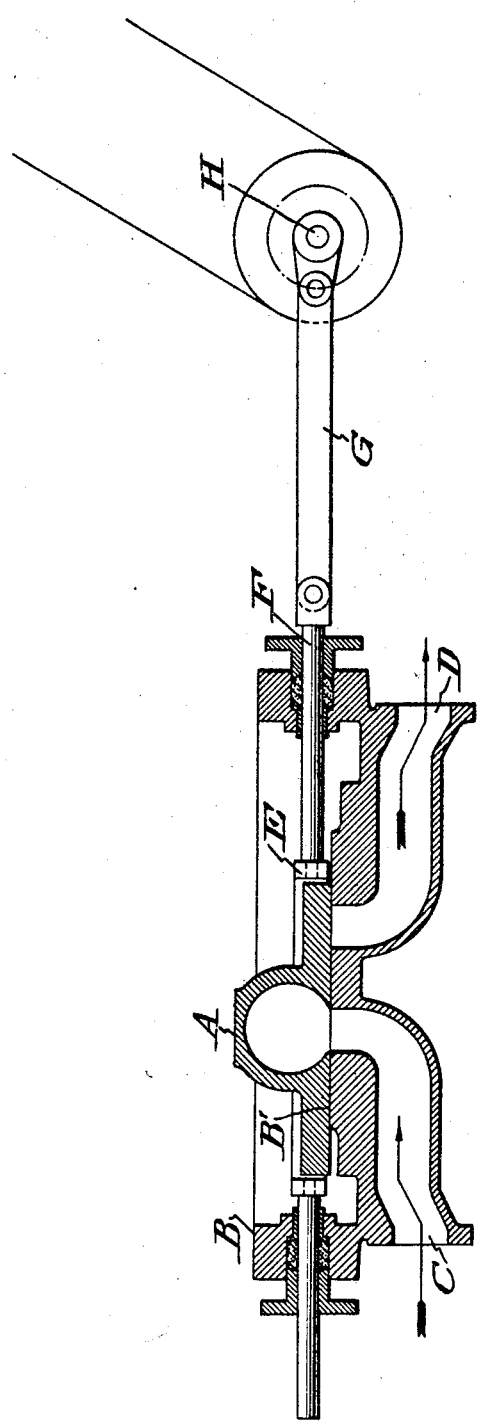

Patented Aug. 23, 1932

1,872,650

UNITED STATES PATENT OFFICE

WALDEMAR BERGER, OF FRANKFORT-ON-THE-MAIN-HOCHST, GERMANY, ASSIGNOR TO I. G. FARBENINDUSTRIE AKTIENGESELLSCHAFT, OF FRANKFORT-ON-THE-MAIN, GERMANY

DEVICE FOR MEASURING LIQUIDS

Application filed November 21, 1929, Serial No. 408,869, and in Germany November 27, 1928.

The present invention relates to a device for measuring liquids.

Devices for supplying liquids in measured quantities used for industrial purposes consist of plunger pumps, pinion pumps, rotary pumps, bucket wheels, measuring cocks and the like.

All these devices have the great drawback that the parts which move become much worn, particularly if the liquid to be measured attacks the material. The moving parts are then no longer tight and liquid escapes through the stuffing box. Should the device become clogged, the dismounting and cleaning of the parts causes much trouble, to which is added, in case of caustic liquids, much inconvenience to the workmen.

It is an object of this invention to provide a measuring device which does not become leaky by wear of the parts. Another object is to facilitate the dismounting of the parts.

With these objects in view the measuring chamber is comprised in a slide that has a reciprocating movement on a plane surface in which are the orifices of the admission and discharged pipes; these fill and empty the chamber during its motion. The slide rests freely on the plane so that the wear due to its movement does not give rise to leakage, since the tightness to liquid is due solely to the accuracy of contact between the surface of the slide and that of the plane, and this is not affected by the wear. For moving the slide it may rest within a frame connected with a driving crank or the like. The speed of reciprocation may be varied to determine the quantity of liquid delivered in unit time. The operation of dismounting the parts resolves itself into lifting the slide from the plane.

The accompanying drawing represents a longitudinal section through a measuring device which illustrates the invention.

A is the measuring chamber having approximately the capacity which corresponds with the required efficiency. B is the support of the measuring chamber and has the plane surface B' on which the measuring chamber slides. C is the inlet pipe through which the liquid coming from the reservoir may run into the measuring chamber. D is the outlet pipe through which the measured liquid runs away. E is a frame within which the measuring chamber rests and which is coupled by a guide rod F with the connecting rod G of the crank shaft H. This shaft can be driven for instance through a pair of conical belt pulleys, at various numbers of revolutions so as to adjust the quantity of liquid delivered at each revolution.

The reservoir containing the liquid to be measured is connected with the branch C. When the measuring chamber is caused to slide over the orifice which corresponds with the branch C, the chamber is charged with a certain quantity of liquid. The measuring chamber is then caused to move over the orifice of the branch D where the liquid flows into a suitable receiver connected with this branch.

I claim:

1. A device for measuring liquids comprising a slide having a plane surface, and supporting said slide a base having a plane surface on which the plane surface of said slide rests freely, a measuring chamber within the slide provided with an opening for filling and discharging said chamber, means for causing the slide to reciprocate on the plane surface of the supporting base, and an admission orifice and a discharge orifice in the base adapted respectively to register with the chamber during alternate reciprocations of the slide.

2. A device for measuring liquids comprising a slide having a plane surface, and supporting said slide a base having a plane surface on which the plane surface of said slide rests freely, a measuring chamber within the slide provided with an opening for filling and discharging said chamber, a frame embracing the slide but not rigidly connected therewith, means for causing the frame to reciprocate so as to move the slide on the plane surface of the supporting base, and an admission orifice and a discharge orifice in the base adapted respectively to register with the chamber during alternate reciprocations of the slide.

In testimony whereof, I affix my signature.
WALDEMAR BERGER.